(12) United States Patent
Maegawa et al.

(10) Patent No.: US 9,560,105 B2
(45) Date of Patent: Jan. 31, 2017

(54) SERVER DEVICE AND INFORMATION PROCESSING METHOD

(71) Applicant: SONY CORPORATION, Tokyo (JP)

(72) Inventors: Hirotoshi Maegawa, Tokyo (JP); Kazuhito Ikemoto, Kanagawa (JP); Hideki Matsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 300 days.

(21) Appl. No.: 14/010,656

(22) Filed: Aug. 27, 2013

(65) Prior Publication Data

US 2014/0101327 A1   Apr. 10, 2014

(30) Foreign Application Priority Data

Oct. 5, 2012   (JP) .................................. 2012-223047

(51) Int. Cl.
  *G06F 15/16*   (2006.01)
  *H04L 29/06*   (2006.01)

(52) U.S. Cl.
  CPC ......... *H04L 65/607* (2013.01); *H04L 65/4084* (2013.01); *H04L 65/4092* (2013.01); *H04L 65/602* (2013.01)

(58) Field of Classification Search
  CPC .................... G06F 17/3074; H04L 2012/2849
  See application file for complete search history.

(56) References Cited

U.S. PATENT DOCUMENTS

| | | | | |
|---|---|---|---|---|
| 8,094,725 B2* | 1/2012 | Nakahara et al. | ........ | 375/240.24 |
| 8,356,324 B2* | 1/2013 | Rajakarunanayake | ......... | 725/88 |
| 8,914,280 B2* | 12/2014 | Sung et al. | ................... | 704/219 |
| 2003/0035064 A1* | 2/2003 | Torikoshi et al. | ............ | 348/515 |
| 2004/0044720 A1* | 3/2004 | Jang et al. | ..................... | 709/200 |
| 2005/0005020 A1* | 1/2005 | Rey et al. | ..................... | 709/231 |
| 2012/0200774 A1* | 8/2012 | Ehlers, Sr. | ................... | 348/515 |
| 2013/0028088 A1* | 1/2013 | Do et al. | ...................... | 370/235 |
| 2013/0031222 A1* | 1/2013 | Molander | ..................... | 709/219 |

FOREIGN PATENT DOCUMENTS

JP    2011-119971    6/2011
WO   WO 2011094845 A1 *  8/2011

* cited by examiner

*Primary Examiner* — Umar Cheema
*Assistant Examiner* — Tesfu Mekonen
(74) *Attorney, Agent, or Firm* — Paratus Law Group, PLLC

(57) ABSTRACT

There is provided a server device including a streaming processing unit configured to generate a frame image in real time, encode the frame image to generate encoded data, and transmit the encoded data to a client device over a network, the client device being configured to decode the encoded data and output the frame image, and a controller configured to receive information related to an output timing of the frame image in the client device from the client device and control a process timing of the frame image in the streaming processing unit so that a predetermined relationship is maintained between the output timing and the process timing.

17 Claims, 10 Drawing Sheets

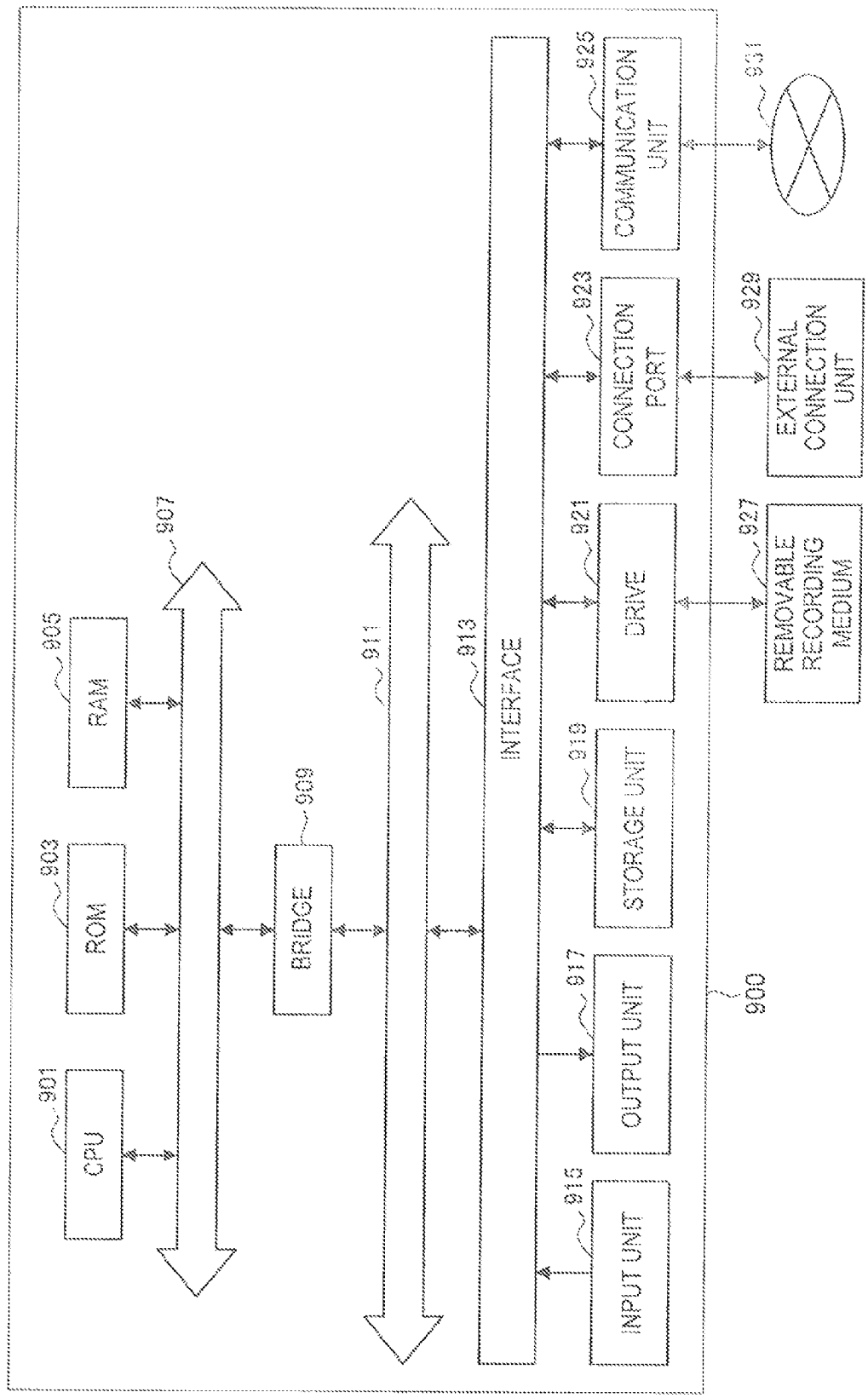

SERVER DEVICE AND INFORMATION PROCESSING METHOD

BACKGROUND

The present disclosure relates to a server device and an information processing method.

In a streaming system in which video or audio is distributed from a server to a client over a network, for example, there is the variation (jitter) of data transfer rate due to change in a communication state of the network. When the communication state where a data transfer rate is lower than a value in the design continues, there is a possibility of occurrence of frame loss. That is, the frame loss means that a frame image, which would have been displayed in a normal condition, is not displayed on a client due to the delay of data transfer.

In order to prevent the occurrence of frame loss, for example, techniques as disclosed in Japanese Unexamined Patent Application Publication No. 2011-119971 have been proposed. In these techniques, the data transfer rate of a server is changed depending on a buffer state of data of a frame image in a client. When data of a frame image being buffered in a client is reduced, it is possible to prevent the occurrence of frame loss by lowering a transfer rate of data, but it leads to degradation of the image quality.

SUMMARY

However, in a streaming system in which a frame image generated in real time in a server is encoded sequentially and then is transmitted to a client, it is necessary to make a time difference from when a server generates a frame image to when a client outputs a frame image as small as possible. In this case, it is desirable to make the frame image being buffered in a client as small as possible. Thus, in the streaming system as described above, the size of a buffer in the client may be further smaller than that in the technique disclosed in Japanese Unexamined Patent Application Publication No. 2011-119971 or other related art.

Consequently, it is necessary to reduce frame loss due to the network delay as described above and its effects with high accuracy, and further, in addition to this, it is necessary to take measures for preventing a frame loss or buffer overflow that occurs even when the network delay is small. In accordance with an embodiment of the present disclosure, there is provided a novel and improved server device and information processing method that capable of identifying the cause of the above-described frame loss or buffer overflow and controlling the buffer state of a frame image generated in real time at a client side in a streaming system with higher accuracy.

According to an embodiment of the present disclosure, there is provided a server device including a streaming processing unit configured to generate a frame image in real time, encode the frame image to generate encoded data, and transmit the encoded data to a client device over a network, the client device being configured to decode the encoded data and output the frame image, and a controller configured to receive information related to an output timing of the frame image in the client device from the client device and control a process timing of the frame image in the streaming processing unit so that a predetermined relationship is maintained between the output timing and the process timing.

Further, according to an embodiment of the present disclosure, there is provided an information processing method including generating a frame image in real time, encoding the frame image to generate encoded data, and transmitting the encoded data to a client device over a network, the client device being configured to decode the encoded data and output the frame image, and receiving information related to an output timing of the frame image in the client device from the client device and controlling a process timing of the frame image so that a predetermined relationship is maintained between the output timing and the process timing.

The predetermined relationship is maintained between the timing at which the frame image is outputted by the client device and the timing at which the frame image is processed by the server device, thereby maintaining a buffer state for the frame image in the client device at a more appropriate condition.

In accordance with embodiments of the present disclosure, in a streaming system in which a frame image is generated in real time, it is possible to control a buffer state at a client side with higher accuracy.

BRIEF DESCRIPTION OF THE DRAWINGS

FIG. 10 is a block diagram for explaining a hardware configuration of an information processing apparatus.

DETAILED DESCRIPTION OF THE EMBODIMENT(S)

Figure 1:
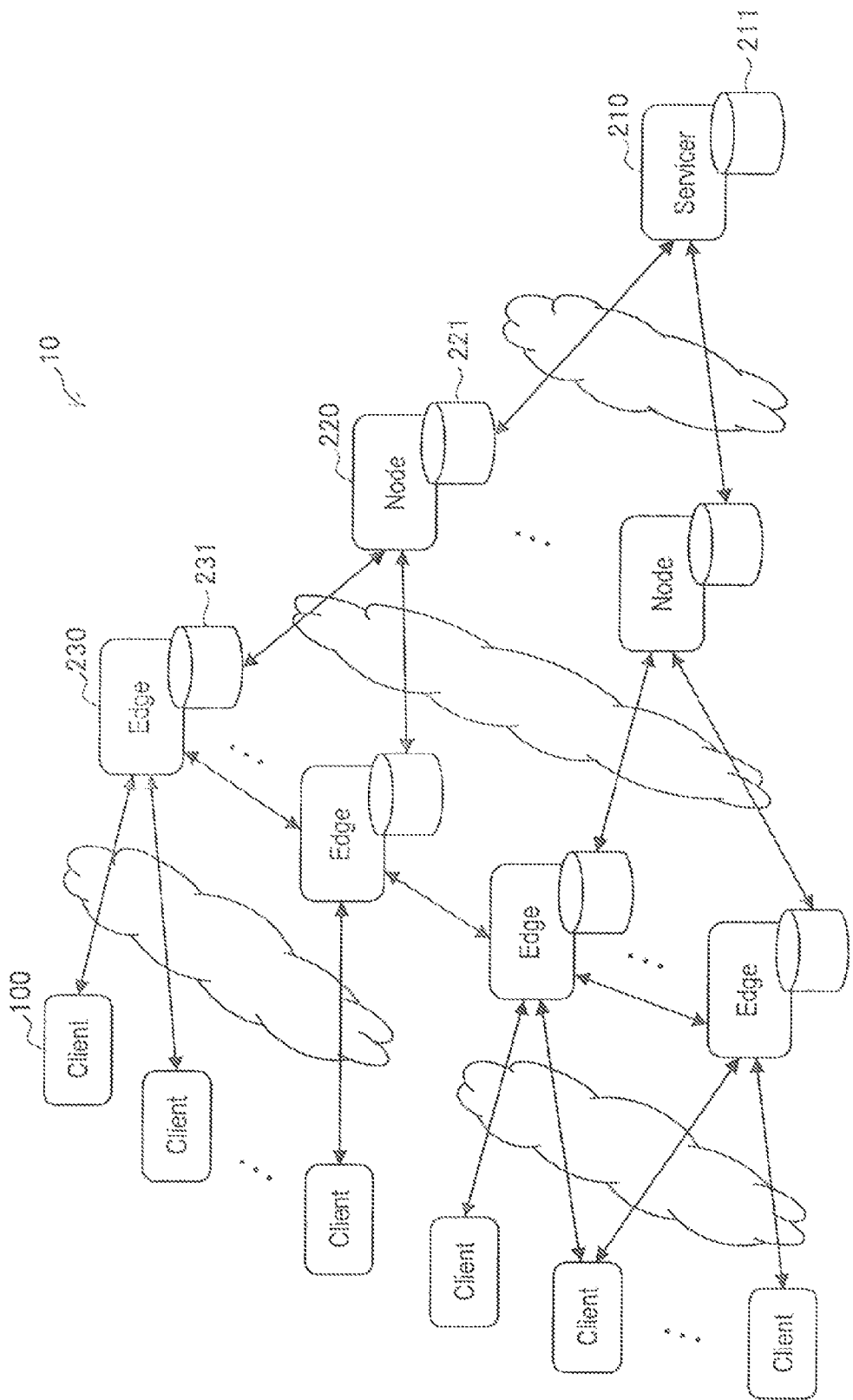
FIG. 1 is a schematic diagram illustrating an overall configuration of a streaming system in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. Streaming System Configuration
1-1. Overall Configuration
1-2. Client and Server Configurations
1-3. Streaming Processing Unit Configuration 2. Configuration for controlling Synchronization Signal
2-1. First Example
2-2. Second Example
2-3. Third Example
3. Hardware Configuration
4. Supplement (1. Streaming System Configuration)

The configuration of a streaming system to which an embodiment of the present disclosure is applied will be described with reference to FIGS. 1 to 4.

(1-1. Overall Configuration)

FIG. 1 is a schematic diagram illustrating an overall configuration of a streaming system with accordance with an embodiment of the present disclosure. Referring to FIG. 1, a streaming system 10 includes a client 100 and a server (servicer 210, node 220, and edge 230) which is configured to distribute streaming contents to the client 100. The client 100 and each server are connected to each other through various types of wired or wireless networks.

The servicer 210 holds original content 211. The node 220 is the node that constitutes a content delivery network (CDN) and holds content 221 obtained by copying the original content held by the servicer 210. The edge 230 performs a direct interaction with the client 110 and appropriately processes the content on request, and provides the processed content to the client 100. In this case, the edge 230 obtains the content held by the node 220 as a cache 231 and provides the content to the client 100 on request from the client 100.

Figure 2:
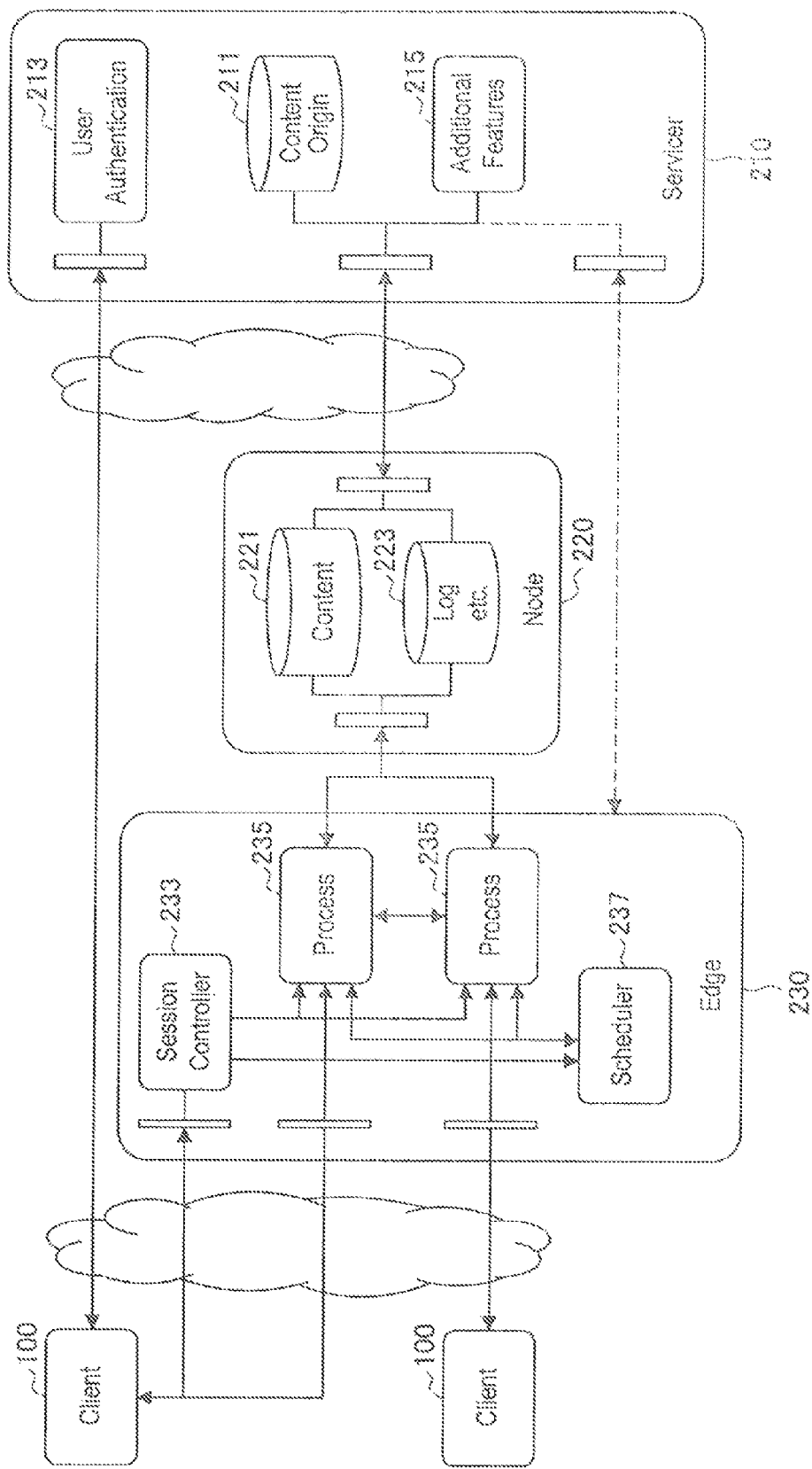
FIG. 2 is a diagram illustrating an example of an information flow in the streaming system in accordance with an embodiment of the present disclosure.

FIG. 2 is a diagram illustrating an example of an information flow in the streaming system in accordance with an embodiment of the present disclosure. The client 100 accesses a user authentication module 213 of the servicer 210 to log into a service prior to distribution of content. When the client 100 is successfully logged into the service, the client 100 accesses a session controller 233 of the edge 230 and requests the session controller 233 to start a process for the client 100. In response to this request, the session controller 233 starts up a process 235.

The edge 230 allows the process 235 to be started up for each client 100 and executes a process for distributing content in response to a request from each client 100. Thus, when the edge 230 provides a service to a plurality of clients 100, a plurality of processes 235 may be started up in the edge 230. Each of the processes 235 is scheduled by a scheduler 237. The scheduler 237 is controlled by the session controller 233.

On the other hand, the original content 211 held by the servicer 210 is previously copied by the node 220 and is held in the node 220 as the content 221. In the process 235 that is activated in the edge 230, the content 221 held in node 220 is obtained as a cache in response to the request from the client 100, the content 221 is appropriately processed, and the processed content is provided to the client 100. In this case, a log of how the content is provided in response to what kind of requests from a client 100 may be recorded in the process 235. This log and other information may be provided to the node 220 by the process 235 and may be held as information 223 in the node 220. The information 223 that contains the log, etc. may be used, for example, by additional features of the servicer 210.

(1-2. Client and Server Configurations)

Figure 3:
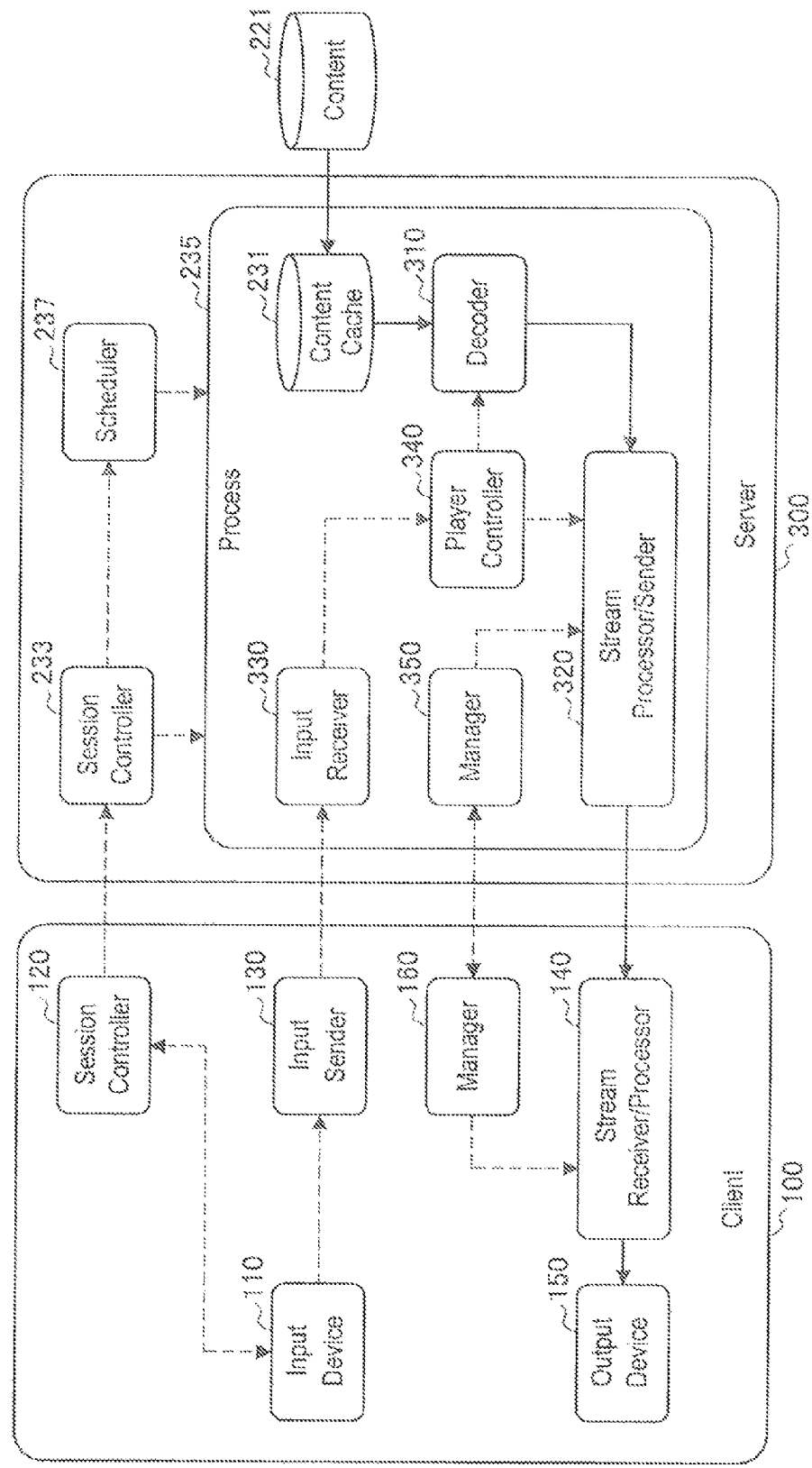
FIG. 3 is a schematic diagram illustrating a functional configuration of a client and server in the streaming system in accordance with an embodiment of the present disclosure.

FIG. 3 is a schematic diagram illustrating a functional configuration of the client and server in the streaming system in accordance with an embodiment of the present disclosure. A server 300 functions as the edge 230 in the streaming system described above with reference to FIGS. 1 and 2. In FIG. 3, a solid line indicates the flow of streaming content to be distributed to a client 100, and a broken line indicates the flow of control information related to the reproduction of the streaming content.

The client 100 is the device that provides streaming content to a user, and may be various types of personal computers, tablet terminals, mobile phones (including smart phones), media players, game consoles, or the like. On the other hand, the server 300 may be a single server device, or may be a collection of functions that are implemented by cooperation of a plurality of server devices connected to each other through various wired or wireless networks. The client 100 and each server device constituting the server 300 may be implemented, for example, using the hardware configuration of an information processing apparatus to be described later. The components, except for a device such as an input and output device, and data (stored in a storage device) among the structural elements illustrated in FIG. 3, may be implemented in software by a processor such as a central processing unit (CPU).

In the client 100, an input device 110 obtains a user's operation input. The input device 110 obtains an operation input related to the outside of content such as login to a service or selection of content and an operation input related to the inside of content such as still/moving image switching, image zoom in/out, or sound quality switching of audio. The operation input related to the outside of content is processed by a session controller 120. The session controller 120 may send input information related to the login to the servicer 210 and may send a request to start a process to the server 300 after login. On the other hand, the operation input related to the inside of content is sent from an input sender 130 to the server 300.

In the server 300, in response to the request to start a process from the client 100, the session controller 233 starts up the process 235. The process 235 obtains the content 221 that is specified by a content selection operation obtained by the input device 110 of the client 100 and holds the obtained content as a content cache 231. The content cache 231 is the encoded data and is decoded by a decoder 310 in the server 300. The decoded content data is processed in a stream processor/sender 320.

On the other hand, an operation input related to the inside of content obtained by the input device 110 of the client 100 is received by an input receiver 330 and is provided to a player controller 340. The player controller 340 controls the decoder 310 or the stream processor/sender 320 in response to the operation input. The stream processor/sender 320 generates video and audio from content data according to the control of the player controller 340. Furthermore, the stream processor/sender 320 encodes the generated video or audio and sends it to the client 100. In the illustrated example, the content includes video and audio, but in other examples, the content may include either one of video and audio.

The encoded data sent to the client 100 is decoded by a stream receiver/processor 140 and is rendered as video or audio, and then is outputted from an output device 150 to a user. The stream processor/sender 320 of the server side is managed by a manager 350, and the stream receiver/processor 140 of the client side is managed by a manager 160. The sever-side manager 350 and the client-side manger 160 cooperate with each other by exchanging information as necessary.

(1-3. Streaming Processing Unit Configuration)

Figure 4:
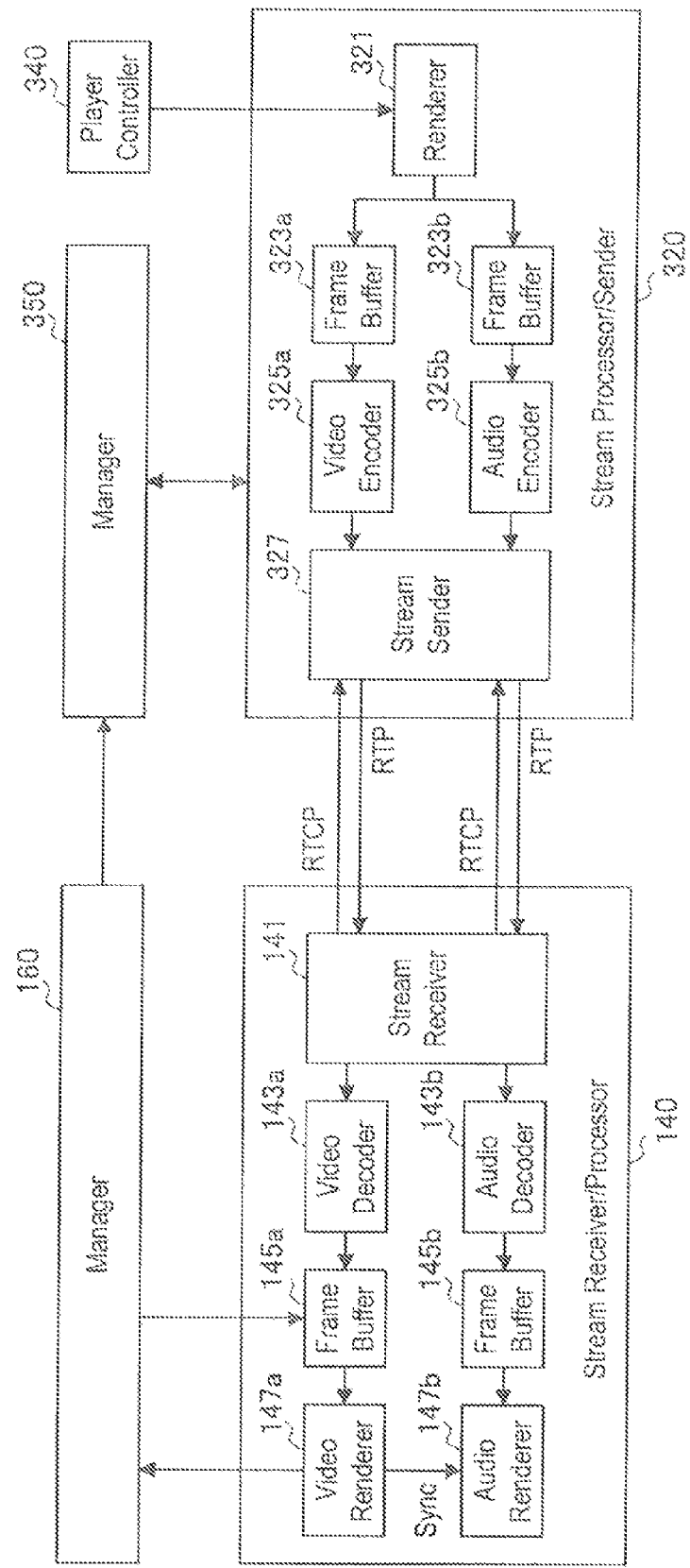
FIG. 4 is a schematic diagram illustrating a functional configuration of a streaming processing unit in accordance with an embodiment of the present disclosure.

FIG. 4 is a schematic diagram illustrating a functional configuration of a streaming processing unit in accordance with an embodiment of the present disclosure. In FIG. 4, functional configurations of the stream receiver/processor 140 of the client 100 and the stream processor/sender 320 of the server 300 are illustrated.

(Client Side)

The stream receiver/processor 140 includes a stream receiver 141, a decoder 143, a frame buffer 145, and a renderer 147. The stream receiver 141 receives data from a stream sender 327 of the server side according to a predetermined protocol. In the illustrated example, a real-time transport protocol (RTP) is used. In this case, the stream receiver 141 provides the received data to the decoder 143. In addition, the stream receiver 141 detects the communication state such as the delay of data, and reports the detected communication state to the stream sender 327 using an RTP control protocol (RTCP).

The decoder 143 decodes data provided from the stream receiver 141 to obtain video or audio data. The decoder 143 includes a video decoder 143a that decodes video data and an audio decoder 143b that decodes audio data. In the stream receiver/processor 140, there may be provided with a plurality of types of each of the video decoder 143a and the audio decoder 143b, which may be selectively used depending on the format of data to be processed. In the following description, any one or both of the video decoder 143a and the audio decoder 143b may be referred to as simply the decoder 143 (when referring to either one of them, whether data to be processed by the one is video or audio will be specified).

The frame buffer 145 temporarily stores the video and audio data obtained by the decoder 143 on a frame-by-frame basis. The frame buffer 145 includes a frame buffer 145a that stores video data and a frame buffer 145b that stores audio data. The frame buffer 145 provides video or audio data in each frame to the renderer 147 at a predetermined timing under the control of the manager 160. In the following description, any one or both of the frame buffer 145a and the frame buffer 145b may be referred to as simply the frame buffer 145 (when referring to either one of them, whether data to be processed by the one is video or audio will be specified).

The renderer 147 includes a video renderer 147a and an audio renderer 147b. The video renderer 147a renders video data and provides the rendered data to an output device such as a display. The audio renderer 147b renders audio data and provides the rendered data to an output device such as a loudspeaker. The video renderer 147a and the audio renderer 147b respectively synchronize frames of video and audio being outputted. In addition, the renderer 147 reports an ID of the outputted frame, the time when the output is performed, or the like to the manager 160. In the following description, any one or both of the video renderer 147a and the audio renderer 147b may be referred to as simply the renderer 147 (when referring to either one of them, whether data to be processed by the one is video or audio will be specified).

(Server Side)

The stream processor/sender 320 includes a renderer 321, a frame buffer 323, an encoder 325, and a stream sender 327. The renderer 321 uses the content data decoded by the decoder 310 as a source material and generates video data and audio data according to the control by the player controller 340 based on the user's operation input. The frame for video and audio data is defined, and the video data is generated as continuous frame images.

The frame buffer 323 temporarily stores the video and audio data generated by the renderer 321 on a frame-by-frame basis. The frame buffer 323 includes a frame buffer 323a that stores video data and a frame buffer 323b that stores audio data. The video data and audio data stored in the frame buffer 323 are sequentially encoded by the encoder 325. In the following description, any one or both of the frame buffer 323a and the frame buffer 323b may be referred to as simply the frame buffer 323 (when referring to either one of them, whether data to be processed by the one is video or audio will be specified).

The encoder 325 includes a video encoder 325a that encodes video data and an audio encoder 325b that encodes audio data. In the stream processor/sender 320, there may be provided with a plurality of types of each of the video encoder 325a and the audio encoder 325b, which may be selectively used depending on the types of the video decoder 143a and the audio decoder 143b that can be used by the client 100 or the characteristics of the video or audio data to be processed. The video data and audio data encoded by the encoder 325 are sent from the stream sender 327 to the client 100. In the following description, any one or both of the video encoder 325a and the audio encoder 325b may be referred to as simply the encoder 325 (when referring to either one of them, whether data to be processed by the one is video or audio will be specified).

According to the configuration of the streaming system in accordance with the present embodiment as described above, in the server which functions as an edge, it is possible to generate video or audio in real time in response to the user's operation input and distribute it to the client. Thus, it is possible to provide applications by the streaming method while maintaining the responsiveness for user's operation input. Such applications includes an application in which images are freely zoomed in/out or moved as described in, for example, Japanese Unexamined Patent Application Publication No. 2010-117828 or various applications such as browsing of a large-sized image or video, on-line games, simulations.

(2. Configuration for Controlling Synchronization Signal)

Referring to FIGS. 5 to 9, the configuration related to the control of a synchronization signal period in according to an embodiment of the present disclosure.

Figure 5:
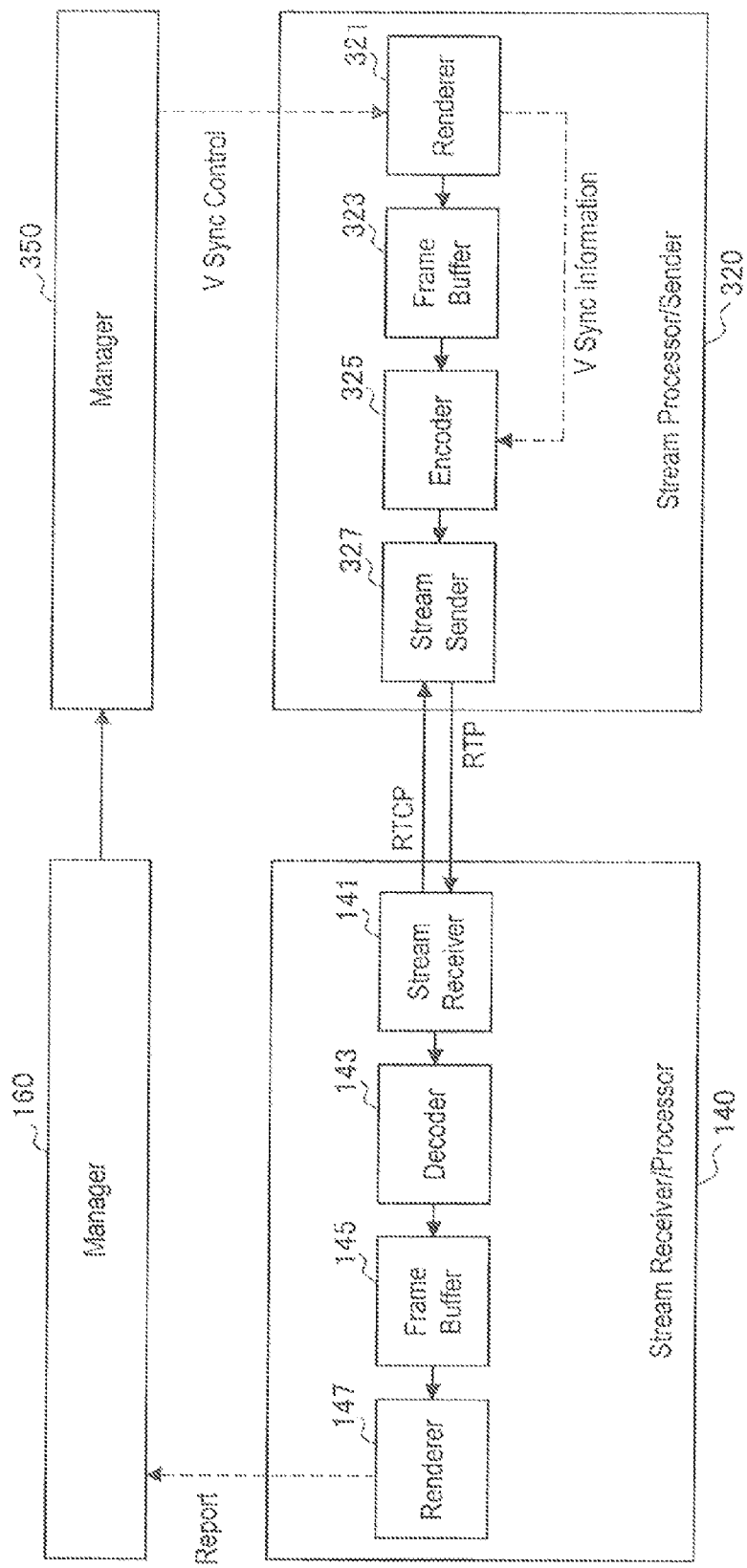
FIG. 5 is a diagram for explaining the control of a synchronization signal in accordance with an embodiment of the present disclosure.

FIG. 5 is a diagram for explaining the control of a synchronization signal in accordance with an embodiment of the present disclosure.

In the streaming system 10, when content having a high real-time property as described above is provided, the frame image being buffered before it is outputted from the client 100 is set to be as small as possible. In this case, in addition to the frame loss due to the network delay being more likely to occur, even if the network delay is small, a frame loss or buffer overflow may occur. Therefore, it is necessary to reduce the frame loss due to the network delay and its effects with high accuracy, and further, in addition to this, it is necessary to take measures for preventing a frame loss or buffer overflow that is caused by different factors.

After further research, as one of the causes of frame loss or buffer overflow as described above, it has been found that there is a time lag between the server 300 and the client 100. A common frame rate is set between the server 300 and the client 100, and the generation of a frame image and the timing of encoding, decoding, and outputting the frame image are defined in each device by a synchronization signal (for example, a vertical synchronization signal (V Sync)) generated at a predetermined period according to the frame rate. However, if there is a lag in time in each of the server 300 and the client 100, the relationship between the timing of a synchronization signal generated in the server 300 and the timing of a synchronization signal generated in the client 100 will be changed. As a result, a frame loss or buffer overflow occurs.

For example, the frequency of a crystal oscillator that defines the time interval in each device varies depending on the characteristics of the crystal oscillator itself, temperature change, or the like. For that reason, there is a possibility that the time interval may be different between the devices. If the time interval of each devices is different between them, for the period of a synchronization signal defined based on the time interval of each devices, there will be time lag between them. If this time lag is accumulated, the process timing of one device precedes increasingly that of the other device. For example, if the period of synchronization signal of the client 100 is shorter than that of the server 300, the process timing of the client 100 precedes increasingly that of the server 300. Thus, the received frame image is increasingly outputted from the client 100 at a timing earlier than an expected timing, thereby, there is a possibility of incurring a frame loss. On the contrary, if a period of synchronization signal of the server 300 is shorter than that of the client 100, the process timing of the server 300 precedes increasingly that of the client 100. Thus, the transmission from the server 300 is continued before the client 100 outputs the received frame image, thereby, there is a possibility of incurring a buffer overflow.

On the other hand, even when the time interval of each device is consistent with each other, for example, if there is congestion in a network circuit, there may be time lag in the time itself of the devices. Then, for the timing of generating a synchronization signal that is set based on the time, there will be time lag between the devices. For example, if the time of the client 100 precedes, to some extent, the time of the server 300, when a synchronization signal of the client 100 is generated at a timing earlier than an expected timing. Thus, data from the server 300 is not reached yet at the timing at which the frame image is to be outputted from the client 100, thereby, there is a possibility of incurring a frame loss. Even if a frame loss does not occur, the amount of frame images buffered by the client 100 is smaller than the expected amount, thus a frame loss due to a network delay or the like is more likely to occur. On the contrary, if the time of the server 300 precedes, to some extent, the time of the client 100, then a synchronization signal of the server 300 is generated at a timing earlier than an expected timing. Thus, the client 100 will send the subsequent frame image before it outputs the previous frame image, and thus there is a possibility of incurring a buffer overflow.

In a normal streaming system, because a buffer provided to the client is large, the effect of time lag as described above is absorbed by the buffer, thus it did not come to the surface. However, in the streaming system 10 that provides content having a high real-time property, a buffer provided to the client is small, and thus the effect of a time lag as described above can result in frame loss or buffer overflow.

Therefore, in the present embodiment, the manger 160 of the client 100 obtains information related to the output timing of a frame image from the renderer 147 and sends the obtained information to the manager 350 of the server 300. The manager 350 controls a process timing of the stream processor/sender 320 based on the received information on that a predetermined relationship is maintained between the timing of outputting a frame image in the client 100 and the timing of processing aflame image in the server 300.

More specifically, the manager 350 controls the timing of generating a synchronization signal (for example, a vertical synchronization signal (V Sync)) that defines the timing of generating a frame image, which is used by the renderer 321. In this regard, the manager 350 may change the period of the synchronization signal in the server 300, or may advance or retard the timing of generating the synchronization signal in the server 300, so that the difference in period of the synchronization signal between the client 100 and the server 300 becomes small. In addition, the manager 350 may change the period of the synchronization signal in the server 300, or may advance or retard the timing of generating the synchronization signal in the server 300 so that the difference in time of synchronization signals between the client 100 and the server 300 falls within a predetermined range. When the timing of generating the synchronization signal is controlled, the renderer 321 notifies information related to the timing of generating the synchronization signal after the control to the encoder 325.

Next, there will be given a description of the first to third examples of information received by the manager 350 from the client 100 and the control of timing of process to be performed based on the information.

(2-1. First Example)

Figure 6:
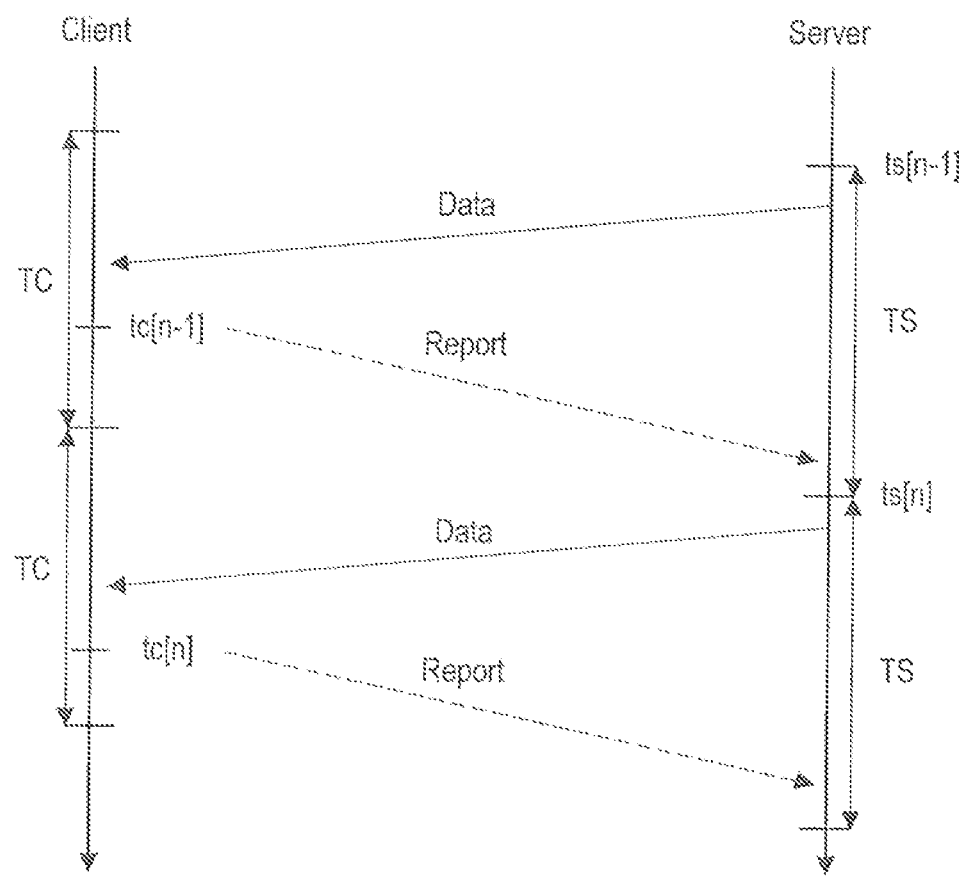
FIG. 6 is a diagram illustrating a first example of controlling a synchronization signal in accordance with an embodiment of the present disclosure.

FIG. 6 is a diagram illustrating a first example of the control of a synchronization signal in accordance with an embodiment of the present disclosure. In the illustrated example, the renderer 147 of the client 100 reports the time tc[n] when the output process of a frame image is started to the manager 160. The manager 350 of the server 300 compares the time tc[n] and a time ts[n]. The time ts[n] is the time when the renderer 321 started the process for generating a frame image. In the following description, [n] indicates that the time or the like is the value for the n-th frame.

(Control Based on Period Difference)

The manager 350 can calculate a period difference between a period TC and a period TS based on the difference between the time tc[n] and the time ts[n]. The period TC is the period of the synchronization signal that defines the timing of outputting a frame image in the client 100. The period TS is the period of the synchronization signal that defines the timing of processing the frame image in the server 300. More specifically, the manager 350 calculates a period difference d[n] using the following Equation (1), based on the difference between the time tc[n] and the time ts[n] for the n-th frame image and the difference between the time tc[n−1] and the time ts[n−1] for the (n−1)-th frame image.

$$d[n]=(tc[n]-ts[n])-(tc[n-1]-ts[n-1]) \qquad (1)$$

In the above Equation (1), the time tc[n] is set at a predetermined timing corresponding to the period TC (tc[n]−tc[n−1]=TC), and the time ts[n] is set at predetermined timing corresponding to the period TS (ts[n]−ts[n−1]=TS). Thus, if the period TC coincides with the period TS, d[n] becomes 0 (d[n]=0). Furthermore, in a case where there is a difference between the period TC and the period TS, if TC is smaller than TS (TC<TS), then d[n] is smaller than 0 (d[n]<0), but if TC>TS, then d[n]>0.

Figure 7:
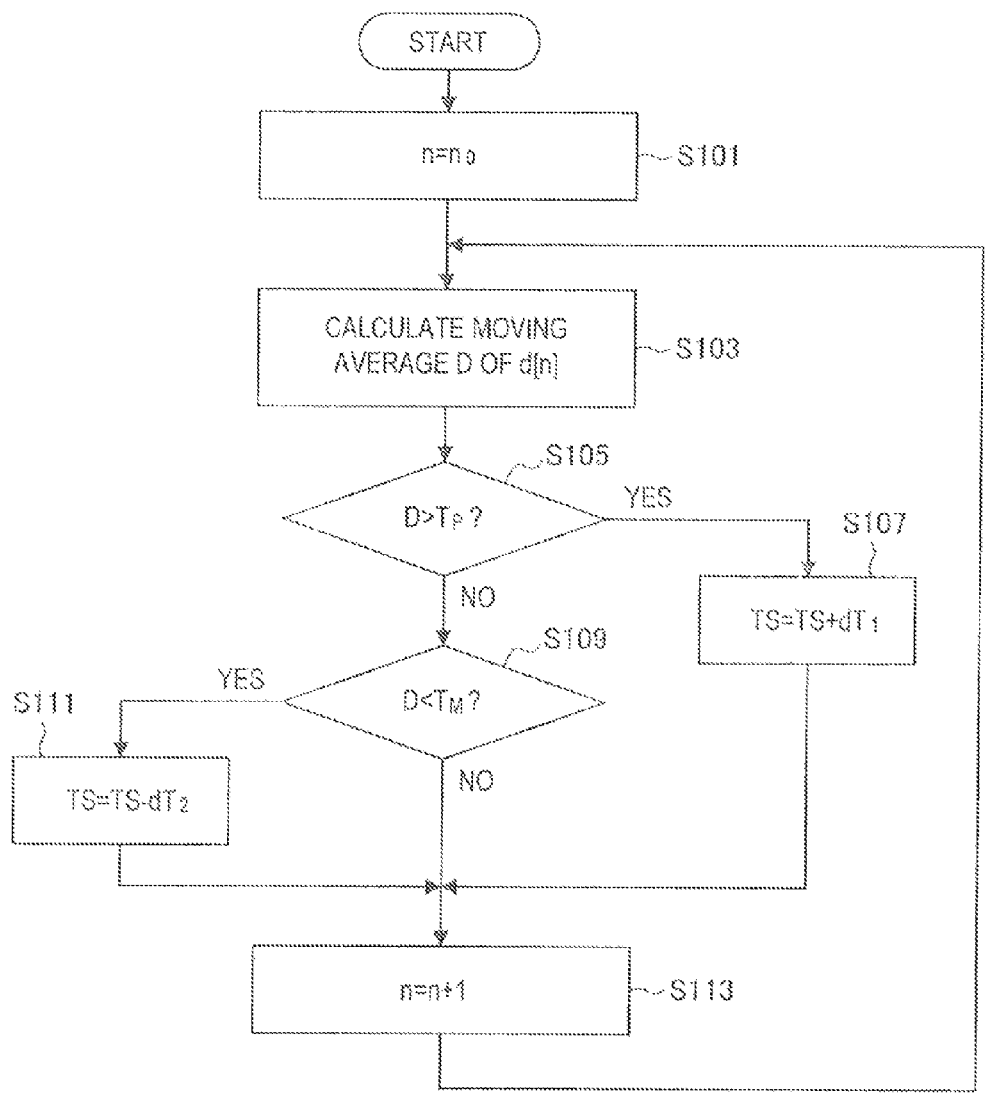
FIG. 7 is a flowchart showing an example of a process according to a period difference in accordance with an embodiment of the present disclosure.

FIG. 7 is a flowchart showing an example of a process according to a period difference in accordance with an embodiment of the present disclosure. As illustrated, the manager 350 of the server 300 calculates the period difference d[n] over a predetermined period of time. Depending on a result obtained by comparing an average value D of the calculated period difference with a predetermined threshold, the manager 350 may change the period TS of the synchronization signal in the server 300, or may advance or retard the timing of processing a frame image in the server 300.

As an initial value, n is set equal to $n_0$ ($n=n_0$) (step S101). For example, $n_0$ corresponds to an optional frame from which the manager 350 starts to control the synchronization signal. Next, the manager 350 calculates a moving average D of the period difference d[n] in a predetermined period of time (step S103). The moving average D indicates an average value of the period difference between the period TC and the period TS in a predetermined period of time.

In this regard, the predetermined period of time is defined, for example, by window size w ($n_0>w$). The manager 350 calculates the period difference between the period TC and the period TS based on a difference between time tc[n] and the time ts[n] for w+1 frames from (n-w)-th frame to n-th frame, and obtains the moving average D by the following Equation (2).

$$D = \frac{\sum_{k=n-w}^{n} d[k]}{w+1} \quad (2)$$

Next, the manager 350 compares the moving average D with a positive threshold $T_P$ (step S105). If the comparison result in step S105 indicates that D is greater than $T_P$ ($D>T_P$) (YES), then the manager 350 increments the period TS of the synchronization signal in the server 300 by a time $dT_1$ (step S107). For example, if the period TC is kept longer than the period TS by $T_P$, the threshold $T_P$ is set as a value such that buffer overflow is likely to occur in the near future. The time $dT_1$ may be set dynamically based on the value of the moving average D (for example, $dT_1=D$), and may be a constant such as a value equal to the threshold $T_P$.

On the other hand, in step S105, if D is not greater than $T_P$ (NO), then the manager 350 compares the moving average D with a negative threshold $T_M$ (step S109). If the comparison result in step S109 indicates that D is smaller than $T_M$ ($D<T_M$) (YES), then the manager 350 decrements the period TS of the synchronization signal in the server 300 by a time $dT_2$. (step S111). For example, if the period TS is kept longer than the period TC by $T_M$, the threshold $T_M$ is set as a value such that frame loss is likely to occur in the near future. The time $dT_2$, may be set dynamically based on the value of the moving average D (for example, $dT_2=|D|$), and may be a constant such as a value equal to the size ($|T_M|$) of the threshold $T_M$.

In step S109, if D is not greater than $T_M$ (NO), then the manager 350 does not change the period TS of the synchronization signal in the server 300 in this cycle. The manager 350 proceeds to a process to be performed on the subsequent frame after setting n=n+1 (step S113).

(Control Based on Time Difference)

The manager 350 can calculate the time difference between the timing of outputting a frame image in the client 100 and the timing of processing a frame image in the server 300 on the basis of the difference between the time tc[n] and the time ts[n]. More specifically, the manager 350 defines the time difference between the time tc[n] and the time ts[n] to be the time difference between the timing of outputting a frame image in the client 100 and the timing of processing a frame image in the server 300. For purposes of explanation, the time difference is shown in the drawings to be shorter than the period (TC or TS) of the synchronization signal, but in fact, the frame image is buffered in the client 100 and thus the time difference may be longer than the period of the synchronization signal.

For example, if there is a difference in time between the time in the client 100 and the time in the server 300 due to congestion in the network circuit, then the time difference would be likely to be greater or smaller than an allowable range of design. If the time difference is too small, that is, the time tc[n] is too close to the time ts[n], then the number of the frame images being buffered in the client 100 is smaller than the expected number of frame images. Thus, if the network delay is increased, then frame loss may be likely to occur. On the other hand, if the time difference is too great, that is, the time tc[n] is too far away from the time ts[n], then buffer overflow may not occur at that time. However, for example, thereafter, if the network delay is decreased and a large number of frame images reach the client 100, then buffer overflow may be likely to occur.

Therefore, the manager 350 may change the period of the synchronization signal in the server 300, or may advance or retard the timing of processing the frame image in the server 300 so that the time difference between the timing of outputting a frame image in the client 100 and the timing of processing a frame image in the server 300 falls within a predetermined range. The predetermined range of the time difference may be determined, for example, by considering the state of network delay that is assumed between the server 300 and the client 100 or the number of frame images that can be appropriately buffered in the client 100. In this regard, the manager 350 may not necessary to adjust the time itself of the client 100 or server 300. In order that a buffer for the frame image in the client 100 is maintained in a normal condition and the frame image is outputted in a smooth manner, it is necessary to maintain a predetermined relationship between the timing of outputting a frame image in the client 100 and the timing of processing a frame image in the server 300.

Even when the control is performed based on the time difference as described above, in a similar way to the control based on the period difference described above with reference to FIG. 7, it is desirable to perform the control by calculating the time difference over a predetermined period of time and smoothing it. In this case, in step S103 of FIG. 7, d[n] is calculated using the following Equation (3).

$$d[n]=(tc[n]-ts[n])-tsc \quad (3)$$

In the above Equation (3), tsc is the design value of the time difference between the timing of outputting a frame image in the client 100 and the timing of processing a frame image in the server 300. Subsequently, in steps S105 and S107, the moving average D (calculated using the Equation (2)) of the difference d[n], which is obtained by subtracting the design value (predetermined value) from the time difference calculated by using the Equation (3), is compared to bath the positive threshold $T_P$ and the negative threshold $T_M$. Thus, in this example, the design value tsc defines the reference value of the predetermined range of the time difference, the threshold $T_P$ defines the upper limit of the predetermined range of the time difference, and the threshold $T_M$ defines the lower limit of the predetermined range of the time difference.

(2-2. Second Example)

Figure 8:
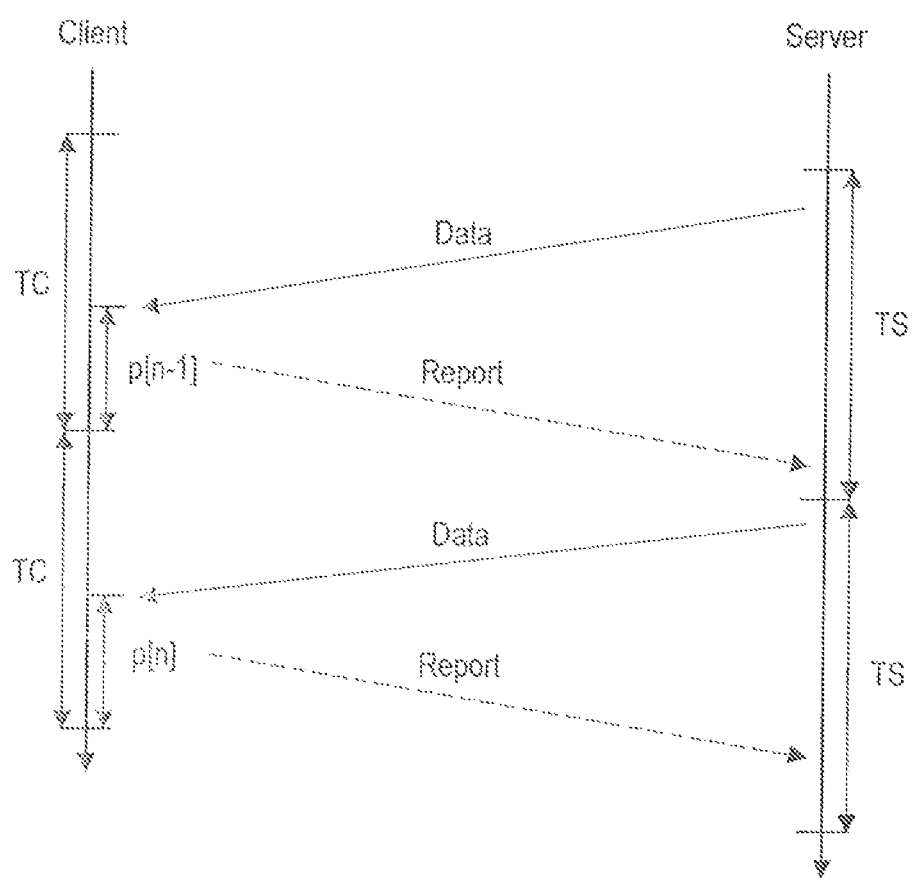
FIG. 8 is a diagram illustrating a second example of controlling a synchronization signal in accordance with an embodiment of the present disclosure.

FIG. 8 is a diagram illustrating a second example of the control of a synchronization signal in accordance with an embodiment of the present disclosure. In the illustrated example, the renderer 147 (or the stream receiver 141) of the client 100 reports an elapsed time p[n] to the manager 160. The elapsed time p[n] is the period of time from when the client 100 receives the encoded data to when the frame image is outputted. The manager 350 of the server 300 can calculate the period difference or time difference based on the elapsed time p[n].

(Control Based on Period Difference)

The manger 350 can calculate the period difference between a period TC and a period TS based on the elapsed time p[n] of each frame. The period TC is the period of the synchronization signal that defines the timing of outputting a frame image in the client 100. The period TS is the period of the synchronization signal that defines the timing of processing the frame image in the server 300. More specifically, the manager 350 calculates the period difference d[n] using the following Equation (4), based on the difference between the elapsed time p[n] for the n-th frame image and the elapsed time p[n−1] for the (n−1)-th frame image.

$$d[n]=p[n]-p[n-1] \qquad (4)$$

In the second example, the period TC is the period of a vertical synchronization signal (V Sync) in the client 100. Thus, the end of the elapsed time p[n] coincides with the end of the period TC. At this time, a vertical synchronization signal is generated, and a frame image is outputted (displayed). On the other hand, the start of the elapsed time p[n] is the time from when the period TS in the server 300 starts to when the time of generating a flame image in the renderer 321, the time of encoding the frame image by the encoder 325, and the time of transmitting the frame image from the stream sender 327 to the stream receiver 141 are elapsed. These times of processing and transmitting are often constant, and thus the start of the elapsed time p[n] reflects the period TS.

Accordingly, if the period TC coincides with the period TS, then every elapsed time p[n] is substantially constant, and thus d[n] calculated using the Equation (4) becomes 0 (d[n]=0). On the other hand, in a case where there is a difference between the period TC and the period TS, if the period TC is smaller than the period TS (TC<TS), the end (output timing: period TC) of the elapsed time p[n] approaches gradually the start (receive timing: period TS) of the elapsed time p[n]. Thus, the elapsed time p[n] becomes gradually shorter and d[n] becomes smaller than 0 (d[n]<0). In addition, if the period TC is greater than the period TS (TC>TS), then the end (output timing: period TC) of the elapsed time p[n] is gradually getting away from gradually the start (receive timing: period TS) of the elapsed time p[n]. Thus, the elapsed time p[n] becomes gradually longer, and d[n] becomes greater than 0 (d[n]>0).

In this regard, the manager 350 of the server 300 calculates the period difference d[n] over a predetermined period of time in a similar way to the first example, and may change the period TS of the synchronization signal in the server 300, or may advance or retard the timing of processing the frame image in the server 300 according to a result obtained by comparing an average value of the calculated period difference with a predetermined threshold. This process is similar to the process described above with reference to FIG. 7 except that the period difference d[n] is calculated using the above Equation (4), and thus a detailed description thereof will be omitted.

(Control Based on Time Difference)

The manager 350 can treat the elapsed time p[n] as a value that indicates the time difference between the timing of outputting a frame image in the client 100 and the timing of processing a frame image in the server 300. More specifically, the manager 350 regards the processing time or transmitting time for the frame image in the server 300 as a predetermined time, and detects variation in time difference based on the change in the elapsed time p[n]. For purposes of explanation, the elapsed time p[n] is shown in the drawings to be shorter than the period (TC or TS) of the synchronization signal, but in fact, the frame image is buffered in the client 100 and thus the elapsed time p[n] may be longer than the period of the synchronization signal.

The elapsed time p[n] indicates the number of frame images that are buffered in the client 100 (the number of frame images that are buffered=elapsed time p[n]/period TC), and thus the manager 350 may change the period of the synchronization signal in the server 300, or may advance or retard the timing of processing the frame image in the server 300 so that the elapsed time p[n] falls within a predetermined range. Alternatively, the manager 350 calculates the time difference by adding a predetermined time corresponding to the processing time or transmitting time to the elapsed time p[n], and may change the period of the synchronization signal in the server 300, or may advance or retard the timing of processing the frame image in the server 300 so that the calculated time difference falls within a predetermined range. The predetermined range of the time difference may be determined, for example, by considering the state of network delay that is assumed between the server 300 and the client 100 or the number of frame images that can be appropriately buffered in the client 100.

Even when the control is performed based on the time difference as described above, in a similar way to the control based on the example described above with reference to FIG. 7, it is desirable to perform the control by calculating the elapsed time or time difference over a predetermined period of time and smoothing it. In this case, for example, in step S103 of FIG. 7, d[n] is calculated using the following Equation (5).

$$d[n]=p[n]-pc \qquad (5)$$

In the above Equation (5), pc is the design value of the elapsed time from when the client 100 receives the encoded data to when the frame image is outputted. Subsequently, in steps S105 and S107, the moving average D (calculated using the Equation (2)) of the difference d[n] obtained by subtracting the design value (predetermined value) from the elapsed time calculated by using the Equation (5) is compared to both the positive threshold $T_P$ and the negative threshold $T_M$. Thus, in this example, the design value pc defines the reference value of the predetermined range of the elapsed time, the threshold $T_P$ defines the upper limit of the predetermined range of the elapsed time, and the threshold $T_M$ defines the lower limit of the predetermined range of the elapsed time.

(2-3. Third Example)

Figure 9:
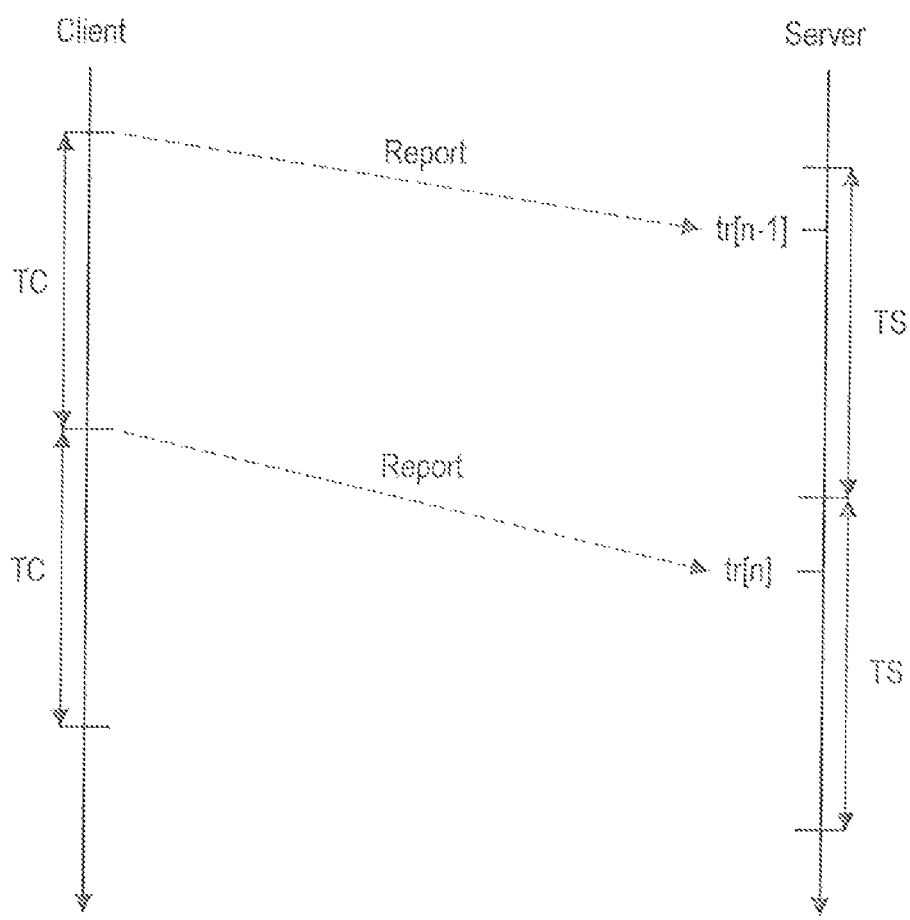
FIG. 9 is a diagram illustrating a third example of controlling of a synchronization signal in accordance with an embodiment of the present disclosure.

FIG. 9 is a diagram illustrating a third example of the control of a synchronization signal in accordance with an embodiment of the present disclosure. In the illustrated example, the notification is transmitted from the manager 160 of the client 100 to the manager 350 of the server 300 at a timing of generating the synchronization signal (for example, a vertical synchronization signal (V Sync)) in the client 100. The manager 350 can calculate the period difference or time difference based on the time tr[n] at which the notification is received.

(Control Based on Period Difference)

The manager 350 can calculate the period difference between a period TC and a period TS based on the receiving time tr[n] of the notification for each frame. The period TC is the period of the synchronization signal that defines the timing of outputting a frame image in the client 100. The period TS is the period of the synchronization signal that defines the timing of processing the frame image in the server 300. More specifically, the manager 350 calculates the period difference d[n] using the following Equation (6), by regarding the network delay in the notification transmission to be substantially constant, and regarding the difference between the receiving time tr[n] of the notification for n-th frame and the receiving time tr[n−1] of the notification for (n−1)-th frame to be equal to the period TC.

$$d[n]=(tr[n]-tr[n-1])-TS \quad (6)$$

It will be apparent that, in the above Equation (6), if the period TC coincides with the period TS, then d[n] becomes 0 (d[n]=0), if TC is smaller than TS (TC<TS), then d[n] is smaller than 0 (d[n]<0), but if TC is greater than TS (TC>TS), then d[n] becomes greater than 0 (d[n]>0).

In this regard, the manager 350 of the server 300 calculates the period difference d[n] over a predetermined period of time in a similar way to the first example, and may change the period TS of the synchronization signal in the server 300, or may advance or retard the timing of processing the frame image in the server 300 according to a result obtained by comparing an average value of the calculated period difference with a predetermined threshold. This process is similar to the process described above with reference to FIG. 7 except that the period difference d[n] is calculated using the above Equation (6), and thus a detailed description thereof will be omitted.

(Control Based on Time Difference)

The manager 350 can treat the receiving time tr[n] of the notification for frame as a value which indicates the time difference between the timing of outputting a frame image in the client 100 and the timing of processing a frame image in the server 300. More specifically, the manager 350 regards the network delay in the notification transmission to be substantially constant, and detects variation in time difference based on the change in the difference between the receiving time tri and the time ts[n] at which the renderer 321 starts the process of generating a frame image (the time at which the synchronization signal is generated in the server 300). In a similar way to the first example, the manager 350 changes the period of the synchronization signal in the server 300, or the manager 350 advance or retard the timing of processing the frame image in the server 300, so that the difference between the time tr[n] and the time ts[n] falls within a predetermined range. Alternatively, the manger 350 calculates the time difference by subtracting the estimated time of network delay from the difference between the time tr[n] and the time ts[n], and may change the period of the synchronization signal in the server 300. or may advance or retard the timing of processing the frame image in the server 300 so that the calculated time difference falls within a predetermined range. The predetermined range of the time difference may be determined, for example, by considering the state of network delay that is assumed between the server 300 and the client 100 or the number of frame images that can be appropriately buffered in the client 100.

Even when the control is performed based on the time difference as described above, in a similar way to the example described above with reference to FIG. 7, it is desirable to perform the control by calculating the difference or time difference between the time tr[n] and the time ts[n] over a predetermined period of time and smoothing it. In this case, in step S103 of FIG. 7, d[n] is calculated using the following Equation (7).

$$d[n]=(tr[n]-ts[n])-trs \quad (7)$$

In the above Equation (7), trs is the design value of the difference between the time when the synchronization signal is generated in the server 300 and the time when the notification transmitted at the timing of generating the synchronization signal in the client 100 is received by the server 300. Subsequently, in steps S105 and S107, the moving average D (calculated using the Equation (2)) of the difference d[n] obtained by subtracting the design value (predetermined value) from the difference between times, which is calculated by using the Equation (7), is compared to both the positive threshold $T_P$ and the negative threshold $T_M$. Thus, in this example, the design value pc defines the reference value of the predetermined range of the difference between times, the threshold $T_P$ defines the upper limit of the predetermined range of the difference between times, and the threshold $T_M$ defines the lower limit of the predetermined range of the difference between times.

There have been described the first to third examples of information received by the manager 350 from the client 100 and the control of process timing to be performed based on the information. However, embodiments of the present disclosure are not limited to the above examples. For example, other information from which similar information can be extracted may be reported from the client 100 to the server 300. In addition, either one or both of the control based on the period difference and the control based on the time difference as described in each example may be implemented.

(3. Hardware Configuration)

A hardware configuration of the information processing apparatus according to an embodiment of the present disclosure will be described with reference to FIG. 10. FIG. 10 is a block diagram for explaining a hardware configuration of the information processing apparatus. The illustrated information processing apparatus 900 may be implemented, for example, as the client 100 and the server 300 in the embodiments described above.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input unit 915, an output unit 917, a storage unit 919, a drive 921, a connection port 923, and a communication unit 925. The information processing apparatus 900 may include a processing circuit such as a DSP (Digital Signal Processor), alternatively or in addition to the CPU 901.

The CPU 901 serves as an operation processor and a controller, and controls all or some operations in the information processing apparatus 900 in accordance with various programs recorded in the ROM 903, the RAM 905, the storage unit 919 or a removable recording medium 927. The ROM 903 stores programs and operation parameters which are used by the CPU 901. The RAM 905 primarily stores program which are used in the execution of the CPU 901 and parameters which is appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input unit 915 may be a device which is operated by a user, such as a mouse, a keyboard, a touch panel, buttons, switches and a lever. The input unit 915 may be, for example, a remote control unit using infrared light or other radio waves, or may be an external connection unit 929 such as a portable phone operable in response to the operation of the information processing apparatus 900. Furthermore, the input unit 915 includes an input control circuit which generates an input signal on the basis of the information which is input by a user and outputs the input signal to the CPU 901. By operating the input unit 915, a user can input various types of data to the information processing apparatus 900 or issue instructions for causing the information processing apparatus 900 to perform a processing operation.

The output unit 917 includes a device capable of visually or audibly notifying the user of acquired information. The output unit 917 may include a display device such as LCD (Liquid Crystal Display), PDP (Plasma Display Panel), and organic EL (Electro-Luminescence) displays, an audio output device such as speaker and headphone, and a peripheral device such as printer. The output unit 917 may output the results obtained from the process of the information processing apparatus 900 in a form of a video such as text or image, and an audio such as voice or sound.

The storage unit 919 is a device for data storage which is configured as an example of a storage unit of the information processing apparatus 900. The storage unit 919 includes, for example, a magnetic storage device such as HDD (Hard Disk Drive), a semiconductor storage device, an optical storage device, or a magneto-optical storage device. The storage unit 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 can write in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection unit 929 to the connection port 923 makes it possible to exchange various data between the information processing apparatus 900 and the external connection unit 929.

The communication unit 925 is, for example, a communication interface including a communication device or the like for connection to a communication network 931. The communication unit 925 may be, for example, a communication card for a wired or wireless LAN (Local Area Network), Bluetooth (registered trademark), WUSB (Wireless USB) or the like. In addition, the communication unit 925 may be a router for optical communication, a router for ADSL (Asymmetric Digital Subscriber Line), a modem for various kinds of communications, or the like. The communication unit 925 can transmit and receive signals to and from, for example, the Internet or other communication devices based on a predetermined protocol such as TCP/IP. In addition, the communication network 931 connected to the communication unit 925 may be a network or the like connected in a wired or wireless manner, and may be, for example, the Internet, a home LAN, infrared communication, radio wave communication, satellite communication, or the like.

As above, the exemplary hardware configuration of the information processing apparatus 900 has been described. Each of the above-described constituent elements may be configured using general-purpose members, or may be configured by hardware specialized to the function of each constituent element. Therefore, a hardware configuration to be used may be appropriately modified according to the technical level at the time of implementing the embodiment.

(4. Supplement)

Embodiments of the present disclosure may include the server device described above, a system, an information processing method executed in the server device or the system, a program for causing the server device to function, and a recording medium with the program recorded thereon.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A server device including:

a streaming processing unit configured to generate a frame image in real time, encode the frame image to generate encoded data, and transmit the encoded data to a client device over a network, the client device being configured to decode the encoded data and output the frame image; and a controller configured to receive information related to an output timing of the frame image in the client device from the client device and control a process timing of the frame image in the streaming processing unit so that a predetermined relationship is maintained between the output timing and the process timing.

(2) The server device according to (1), wherein the controller receives information indicating a period of a first synchronization signal defining the output timing and controls the process timing so that a period difference between the period of the first synchronization signal and a period of a second synchronization signal defining the process timing is small.

(3) The server device according to (2), wherein the controller receives information indicating a first timing at which an output process for the frame image is started in the client device, and calculates the period difference by comparing the first timing with a second timing at which a generation of the flame image is started in the streaming processing unit.

(4) The server device according to (2), wherein the controller receives information indicating an elapsed time from when the client device receives the encoded data to when the frame image is outputted, and calculates the period difference based on a change in the elapsed time.

(5) The server device according to (2), wherein the controller receives a signal transmitted by the client device at each period of the first synchronization signal, and calculates the period difference by comparing a period of receiving the signal with the period of the second synchronization signal.

(6) The server device according to any one of (2) to (5), wherein the controller calculates the period difference over a predetermined period of time, and controls the process timing depending on a result obtained by comparing an average value of the calculated period difference with a predetermined threshold.

(7) The server device according to any one of (1) to (6), wherein the controller controls the process timing so that a value indicating a time difference between the process timing and the output timing falls within a predetermined range.

(8) The server device according to (7), wherein the controller receives information indicating a first timing at which an output process for the frame image is started in the client device, and calculates the value indicating the time difference by comparing the first timing with a second timing at which a generation of the frame image is started in the streaming processing unit.

(9) The server device according to (7), wherein the controller receives information indicating an elapsed time from when the client device receives the encoded data to when the frame image is outputted, and controls the process timing so that the elapsed time falls within a predetermined range.

(10) The server device according to (7), wherein the controller receives a signal transmitted by the client device at each period of a first synchronization signal defining the output timing, and controls the process timing so that a time difference between a timing of receiving the signal and the process timing falls within a predetermined range.

(11) The server device according to any one of (7) to (10), wherein the controller obtains a value indicating the time difference over a predetermined period of time, and controls the process timing depending on a result obtained by comparing an average value of the obtained value with a predetermined threshold.

(12) The server device according to any one of (1) to (11), wherein the controller controls the process timing by changing a period of a second synchronization signal defining the process timing.

(13) The server device according to any one of (1) to (11), wherein the controller controls the process timing by advancing or retarding the process timing.

(14) The server device according to any one of (1) to (13), further including:
a receiver configured to receive an operation input obtained in the client device over the network,
wherein the streaming processing unit generates the frame image in real time according to the operation input,

(15) An information processing method, including:
generating a frame image in real time, encoding the frame image to generate encoded data, and transmitting the encoded data to a client device over a network, the client device being configured to decode the encoded data and output the frame image; and
receiving information related to an output timing of the frame image in the client device from the client device and controlling a process timing of the frame image so that a predetermined relationship is maintained between the output timing and the process timing.

The present disclosure contains subject matter related to that disclosed in Japanese Priority Patent Application JP 2012-223047 filed in the Japan Patent Office on Oct. 5, 2012, the entire content of which is hereby incorporated by reference.

What is claimed is:

1. A server device comprising:
a streaming processing unit configured to generate a frame image in real time, encode the frame image to generate encoded data, and transmit the encoded data to a client device over a network, the client device being configured to decode the encoded data and output the frame image; and
a controller configured to receive information related to an output timing of the frame image in the client device from the client device and control a process timing of the frame image in the streaming processing unit so that a predetermined relationship is maintained between the output timing and the process timing,
wherein the controller receives information indicating a period of a first synchronization signal defining the output timing and controls the process timing so that a period difference between the period of the first synchronization signal and a period of a second synchronization signal defining the process timing is small,
wherein the controller receives information indicating an elapsed time from when the client device receives the encoded data to when the frame image is outputted, and calculates the period difference based on a change in the elapsed time,
wherein the elapsed time is a period of time from when the client device receives the encoded data to when the frame image is outputted, and
wherein the streaming processing unit and the controller are each implemented via at least one processor.

2. The server device according to claim 1, wherein the controller receives information indicating a first timing at which an output process for the frame image is started in the client device, and calculates the period difference by comparing the first timing with a second timing at which a generation of the frame image is started in the streaming processing unit.

3. The server device according to claim 1, wherein the controller receives a signal transmitted by the client device at each period of the first synchronization signal, and calculates the period difference by comparing a period of receiving the signal with the period of the second synchronization signal.

4. The server device according to claim 1, wherein the controller calculates the period difference over a predetermined period of time, and controls the process timing depending on a result obtained by comparing an average value of the calculated period difference with a predetermined threshold.

5. The server device according to claim 1, wherein the controller controls the process timing so that a value indicating a time difference between the process timing and the output timing falls within a predetermined range.

6. The server device according to claim 5, wherein the controller receives information indicating a first timing at which an output process for the frame image is started in the client device, and calculates the value indicating the time difference by comparing the first timing with a second timing at which a generation of the frame image is started in the streaming processing unit.

7. The server device according to claim 5, wherein the controller receives information indicating an elapsed time from when the client device receives the encoded data to when the frame image is outputted, and controls the process timing so that the elapsed time falls within a predetermined range.

8. The server device according to claim 5, wherein the controller receives a signal transmitted by the client device at each period of a first synchronization signal defining the output timing, and controls the process timing so that a time difference between a timing of receiving the signal and the process timing falls within a predetermined range.

9. The server device according to claim 5, wherein the controller obtains a value indicating the time difference over a predetermined period of time, and controls the process timing depending on a result obtained by comparing an average value of the obtained value with a predetermined threshold.

10. The server device according to claim 1, wherein the controller controls the process timing by changing a period of a second synchronization signal defining the process timing.

11. The server device according to claim 1, wherein the controller controls the process timing by advancing or retarding the process timing.

12. The server device according to claim 1, further comprising:
a receiver configured to receive an operation input obtained in the client device over the network,
wherein the streaming processing unit generates the frame image in real time according to the operation input.

13. An information processing method executed via a processor, the method comprising:
generating a frame image in real time, encoding the frame image to generate encoded data, and transmitting the encoded data to a client device over a network, the client device being configured to decode the encoded data and output the frame image;
receiving information related to an output timing of the frame image in the client device from the client device and controlling a process timing of the frame image so that a predetermined relationship is maintained between the output timing and the process timing;
receiving information indicating a period of a first synchronization signal defining the output timing;
controlling the process timing so that a period difference between the period of the first synchronization signal and a period of a second synchronization signal defining the process timing is small;
receiving information indicating an elapsed time from when the client device receives the encoded data to when the frame image is outputted; and
calculating the period difference based on a change in the elapsed time,
wherein the elapsed time is a period of time from when the client device receives the encoded data to when the frame image is outputted.

14. The server device according to claim 1, wherein the output timing corresponds to a timing of outputting the frame image in the client device.

15. The server device according to claim 1, wherein the process timing corresponds to a timing of processing the frame image in the server.

16. The information processing method to claim 14, wherein the output timing corresponds to a timing of outputting the frame image in the client device.

17. The information processing method according to claim 13, wherein the process timing corresponds to a timing of processing the frame image in the server.

* * * * *